(12) United States Patent
Sasaki

(10) Patent No.: US 8,978,672 B2
(45) Date of Patent: Mar. 17, 2015

(54) ELECTRONIC ACOUSTIC SIGNAL GENERATING DEVICE AND ELECTRONIC ACOUSTIC SIGNAL GENERATING METHOD

(71) Applicant: Yamaha Corporation, Hamamatsu-shi, Shizuoka (JP)

(72) Inventor: Naoya Sasaki, Hamamatsu (JP)

(73) Assignee: Yamaha Corporation (JP)

( * ) Notice: Subject to any disclaimer, the term of this patent is extended or adjusted under 35 U.S.C. 154(b) by 154 days.

(21) Appl. No.: 13/883,044

(22) PCT Filed: Oct. 24, 2012

(86) PCT No.: PCT/JP2012/077461
§ 371 (c)(1),
(2) Date: May 2, 2013

(87) PCT Pub. No.: WO2013/061998
PCT Pub. Date: May 2, 2013

(65) Prior Publication Data
US 2013/0215070 A1    Aug. 22, 2013

(30) Foreign Application Priority Data
Oct. 24, 2011    (JP) ................................. 2011-232614

(51) Int. Cl.
*G06F 3/041* (2006.01)
*G10H 1/00* (2006.01)

(52) U.S. Cl.
CPC .............. *G06F 3/041* (2013.01); *G10H 1/0008* (2013.01); *G10H 2220/241* (2013.01); *G10H 2220/395* (2013.01)
USPC ....................................................... 134/173

(58) Field of Classification Search
CPC ........ G06F 3/041; G06F 3/016; G10H 1/0008
See application file for complete search history.

(56) References Cited

U.S. PATENT DOCUMENTS 5,634,046 A * 5/1997 Chatterjee et al. ............. 712/227
7,728,316 B2 * 6/2010 Fadell et al. ............. 250/559.38
(Continued)

FOREIGN PATENT DOCUMENTS

CN    2239634 Y    11/1996
CN    1523571 A    8/2004
(Continued)

OTHER PUBLICATIONS

ISR issued Dec. 4, 2012 for PCT/JP2012/077461 (partial English translation provided).
(Continued)

*Primary Examiner* — Ariel Balaoing
*Assistant Examiner* — Chineyere Wills-Burns
(74) *Attorney, Agent, or Firm* — Rossi, Kimms & McDowell LLP

(57) ABSTRACT

A device includes a touch panel, a display circuit that displays a manipulator on the touch panel, an acceleration sensor that detects an acceleration when a touching action is performed on the manipulator on the touch panel, a storage section that acquires acceleration data that shows the acceleration detected by the acceleration sensor, and saves n number of items of the acceleration data in sequence of newest first; a processing circuit that saves k (wherein k<n) number of the acceleration data items in the storage section, and then selects at least one acceleration data item that matches predetermined conditions from among the n number of acceleration data items that include the k number of acceleration data items; and a sound effect/source circuit that, based on the acceleration data selected by the processing circuit, decides signal characteristics of an acoustic signal that should be generated.

12 Claims, 6 Drawing Sheets

(56) References Cited

U.S. PATENT DOCUMENTS

| | | |
|---|---|---|
| 2004/0184349 A1 | 9/2004 | Terada et al. |
| 2009/0195518 A1* | 8/2009 | Mattice et al. ............... 345/177 |
| 2009/0322498 A1* | 12/2009 | Yun et al. .................. 340/407.2 |
| 2010/0156822 A1 | 6/2010 | Lee et al. |
| 2013/0120282 A1* | 5/2013 | Kukulski ..................... 345/173 |

FOREIGN PATENT DOCUMENTS

| | | |
|---|---|---|
| JP | 11-338470 A | 12/1999 |
| JP | 2010-204401 | 9/2010 |
| JP | 2010-271440 A | 12/2010 |

OTHER PUBLICATIONS

Zen Piano—Use the Force, by GreatApps Ltd., May 22, 2009; http://itunes.apple.com/app/zen-piano-use-force/id315585257?mt=8#.

Chinese Office Action dated Jul. 15, 2014 issued in corresponding Chinese Application No. 2012800048781. English translation provided.

\* cited by examiner

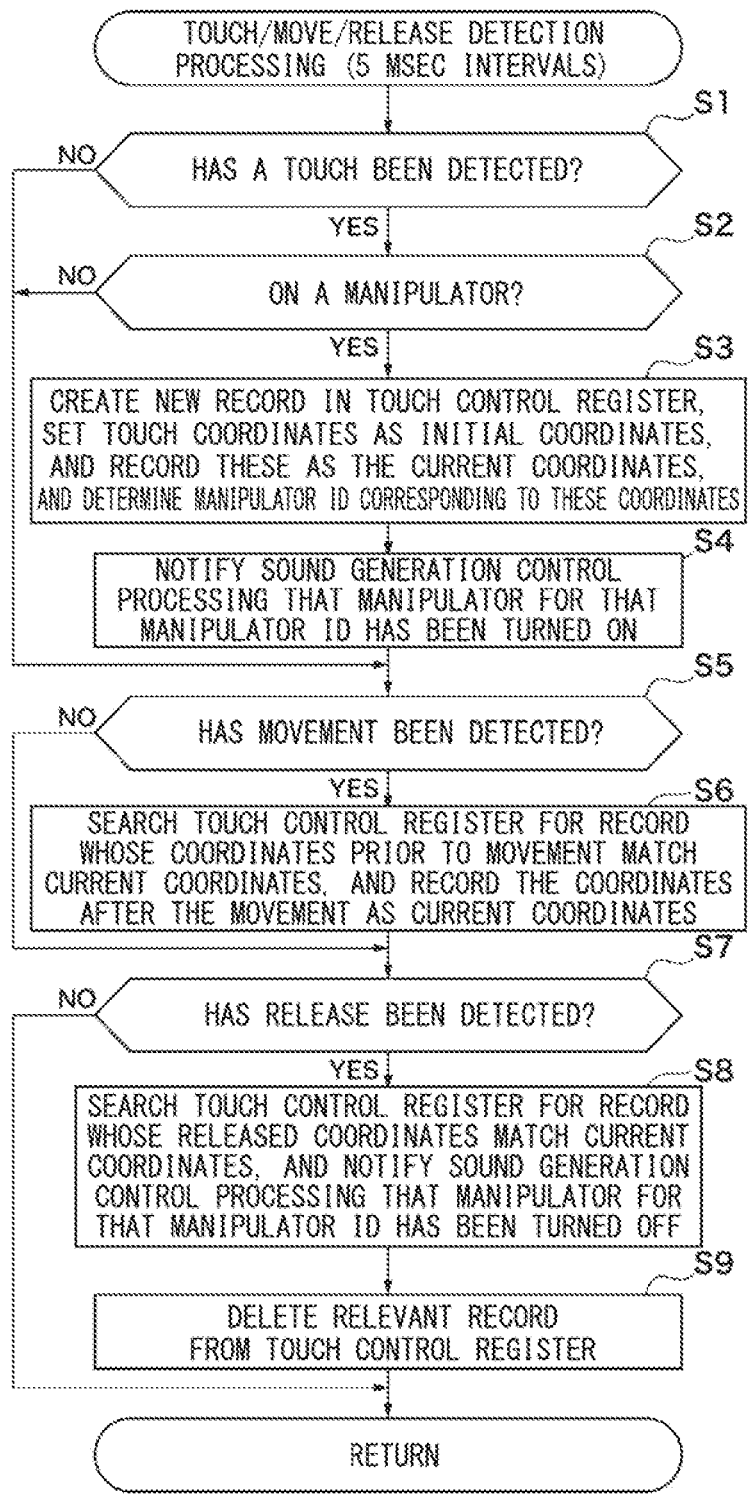

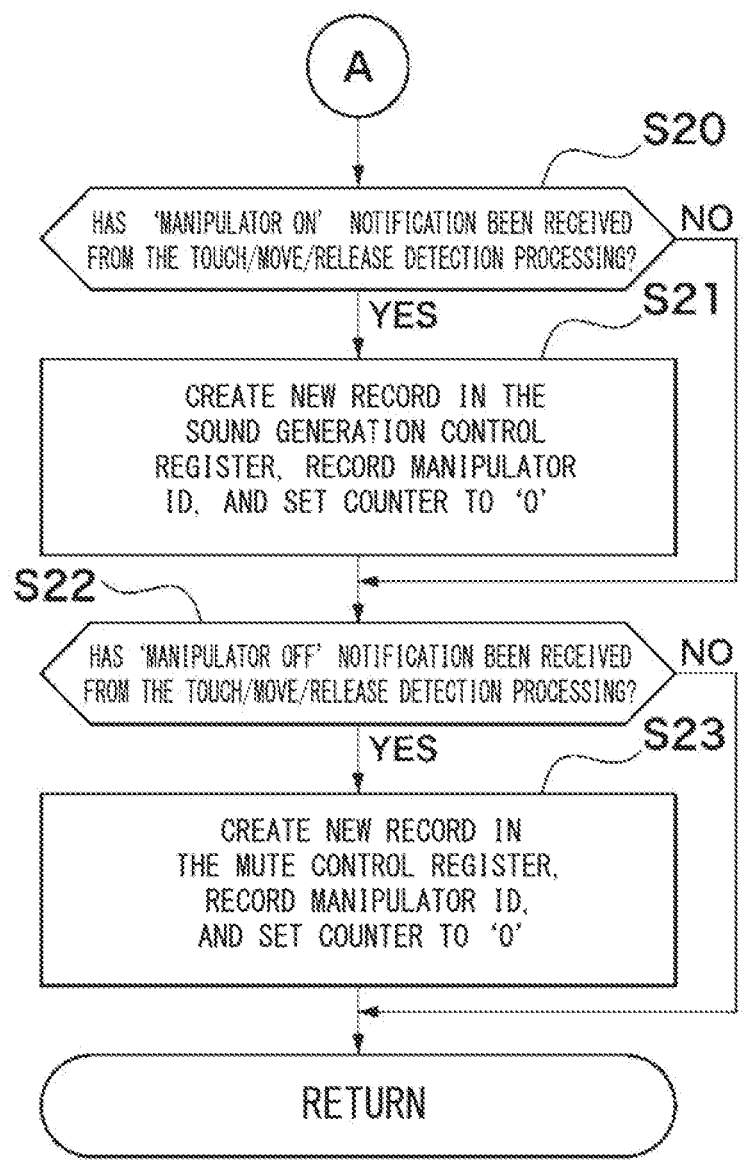

TOUCH CONTROL REGISTER

| INITIAL COORDINATES (x,y) | CURRENT COORDINATES (x,y) |
|---|---|
| INITIAL COORDINATES (x,y) | CURRENT COORDINATES (x,y) |
| : | : |

SOUND GENERATION CONTROL REGISTER

| MANIPULATOR ID | COUNTER |
|---|---|
| MANIPULATOR ID | COUNTER |
| : | : |

MUTE CONTROL REGISTER

| MANIPULATOR ID | COUNTER |
|---|---|
| MANIPULATOR ID | COUNTER |
| : | : |

ELECTRONIC ACOUSTIC SIGNAL GENERATING DEVICE AND ELECTRONIC ACOUSTIC SIGNAL GENERATING METHOD

TECHNICAL FIELD

The present invention relates to an electronic acoustic signal generating device that detects the force of a touching action when a user touches a manipulator displayed on a touch panel display (hereinafter, referred to as 'touch panel'), and decides acoustic signal characteristics based on the detected force, and also to a program that is used to actualize a control method for the same.

Priority is claimed on Japanese Patent Application No. 2011-232614, filed Oct. 24, 2011, the contents of which are incorporated herein by reference.

BACKGROUND ART

An electronic acoustic signal generating device that detects the force of a touching action when a user touches a manipulator displayed on a touch panel, and then decides acoustic signal characteristics based on the detected force is known conventionally.

One type of electronic acoustic signal generating device is a mobile terminal or tablet device (see, for example, Non-patent document 1) that is provided with a touch panel and an acceleration sensor, and that reflects the force with which a user taps the keys of a keyboard displayed on the touch panel (i.e., the force of the touching action) in the volume of the sound it generates. In Non-patent document 1, application software is described that is installed on the mobile terminal and enables the mobile terminal to perform the aforementioned function.

DOCUMENTS OF THE PRIOR ART

[Non-patent document 1] Zen Piano—Use the Force, By GreatApps Ltd, Updated: May 22, 2009, http://itunes.apple.com/app/zen-piano-use-force/id315585257?mt=8#

DISCLOSURE OF INVENTION

Problem to be Solved by the Invention

In the aforementioned conventional electronic acoustic signal generating device, because the touch panel is not able to detect the force of the touching action performed by the user, it is presumed that the force of the touching action is detected using an acceleration sensor. However, in the aforementioned Non-patent document 1, absolutely no mention is made as to how the sensor output from the acceleration sensor is used to detect the force of the touching, action.

Moreover, if the force of a touching, action is detected using an acceleration sensor, then it is presumed that the volume of the generated sound is decided in accordance with the size of the acceleration detected by the acceleration sensor, however, generally, there is absolutely no concurrence between the timing at which the touch panel detects the touching action of the user and the timing at which the acceleration sensor detects that touching action. Accordingly, if the output values from an acceleration sensor are detected at the timings when the touch panel detects a touching action, and the volume of the sound is decided and generated in accordance with this, then the force of the touching action performed by the user is not accurately reflected in the decided volume, and in some cases, a sound whose volume corresponds to the touching action of the user is not generated.

The present invention was conceived after this point considered, and it is an object thereof to provide an electronic acoustic signal generating device and an electronic acoustic signal generating method that make it possible to decide acoustic signal characteristics that correspond to the touching action of a user.

Means for Solving the Problem

In order to achieve the above-described object, the electronic acoustic signal generating device of the present invention has: a touch panel; a display circuit that displays a manipulator on the touch panel; an acceleration sensor that detects an acceleration when a touching action is performed on the manipulator on the touch panel; a storage section that acquires at predetermined regular intervals acceleration data that shows the acceleration detected by the acceleration sensor, and saves it number of items of the acceleration data in sequence of newest first; a processing circuit that, after a touching action by a user on the manipulator displayed on the touch panel has been detected, saves k (wherein k<n) number of the acceleration data items in the storage section, and then selects at least one acceleration data item that matches predetermined conditions from among the n number of acceleration data items that include the k number of acceleration data items; and a sound effect/source circuit that, based on the acceleration data selected by the processing circuit, decides signal characteristics of an acoustic signal that should be generated.

In the electronic acoustic signal generating device of the present invention, each of the n values and k values can be altered to desired values provided that the condition k<n remains in effect.

In the electronic acoustic signal generating device of the present invention, it is preferable for the sound source/effect circuit to convert the selected acceleration data into velocity values based on predetermined conversion characteristics, and to decide the signal characteristics of the acoustic signal using the converted velocity values.

In order to achieve the above-described objective, an electronic acoustic signal generating program of the present invention causes an electronic acoustic signal generating method of the present invention to be executed on a computer.

Effect of the Invention

According to the present invention, once a touching action by a user on a manipulator displayed on a touch panel has been detected, the device waits for k (wherein k<n) number of acceleration data items to be saved. Next, at least one acceleration data item that matches predetermined conditions is selected from among the n number of saved acceleration data items that include the k number of acceleration data items. Based on this selected acceleration data item, the signal characteristics of the acoustic signal to be generated are decided. Namely, even if there is a difference between the timing, when a touching action by a user on the touch panel is detected, and the timing when that touching action is detected by the acceleration sensor, acceleration data that appropriately shows the acceleration of that touching action by the user is included among the saved n number of acceleration data items. This acceleration data is then selected depending on whether or not it confirms to predetermined conditions and the acoustic signal characteristics are decided based on this. Accordingly, it is possible to decide acoustic signal characteristics that more closely match the acoustic signal characteristics that correspond to the touching action of the user.

BRIEF DESCRIPTION OF THE DRAWINGS

FIG. 4 is a flowchart showing a procedure for touch/move/release detection processing performed by the electronic acoustic signal generating device according to an embodiment of the present invention.

FIG. 5B is a flowchart showing the second half of the procedure for sound generation control processing performed by the electronic acoustic signal generating device according to an embodiment of the present invention.

EMBODIMENTS FOR CARRYING OUT THE INVENTION

Hereinafter, an embodiment of the present invention will be described in detail based on the drawings.

Figure 1:
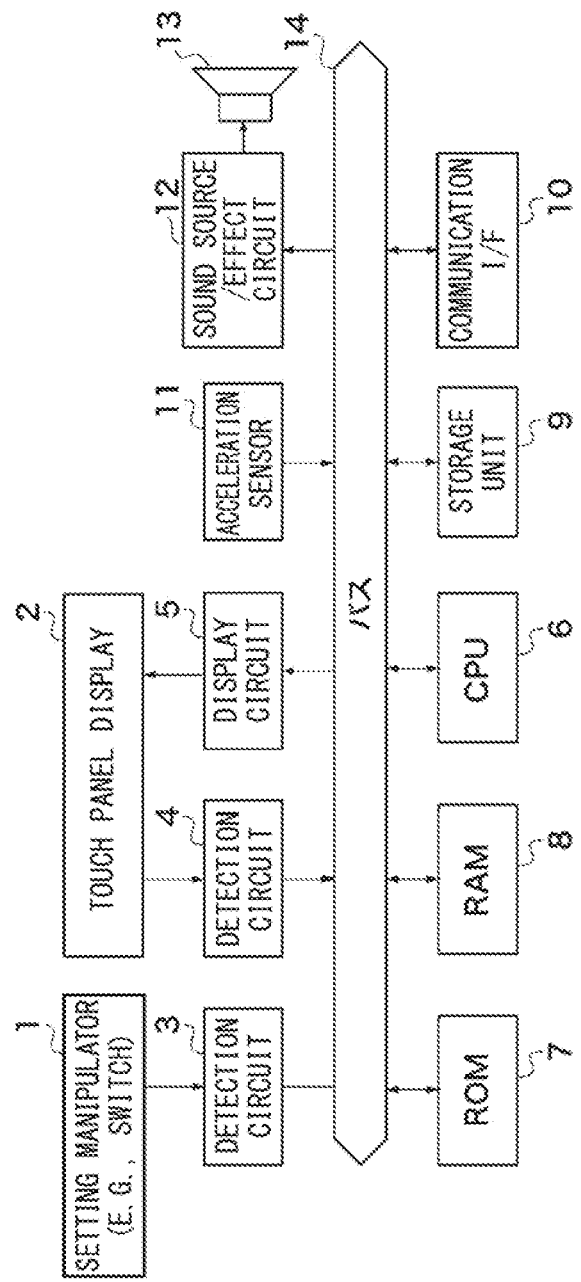
FIG. 1 is a block diagram showing an electronic acoustic signal generating device according to an embodiment of the present invention.

FIG. 1 is a block diagram showing the schematic structure of an electronic acoustic signal generating device according to an embodiment of the present invention.

As is shown in FIG. 1, an electronic acoustic signal generating device according to the present embodiment has a setting manipulator 1 that is formed by a plurality of switches that are used for inputting various types of information, and a touch panel 2 that displays a plurality of setting manipulators that are used to select and set a plurality of performance manipulators, various musical parameters, and various operating modes and to display various types of information, and that selects and sets the corresponding performance states, musical parameters, and operating modes and the like when a user performs a touching action to touch the various manipulators and items of information that are displayed. The setting manipulator 1 is connected to a detection circuit 3 that detects the manipulation state of the setting manipulator 1. The touch panel 2 is connected to a detection circuit 4 that detects touching actions made on the touch panel 2 by a user, and a display circuit 5 that displays on the touch panel 2 a GUI (graphical user interface) that is used to select and set various states and items of information relating to music including the performance conditions, musical parameters, and operating modes.

The detection circuit 3, the detection circuit 4, and the display circuit 5 are connected to a bus 14 that is connected to a CPU 6 that governs the control of the overall device. ROM 7 that stores control programs executed by the CPU 6 as well as various types of table data and the like, RAM 8 that temporarily stores performance information, various types of input information, and performance results and the like, and a storage unit 9 that stores various application programs including the aforementioned control programs, various types of composition data, and various other data and the like are connected to the bus 14. A communication interface (I/F) 10 that connects to an external device (not shown), and that exchanges data with this external device is also connected to the bus 14.

The electronic acoustic signal generating device of the present embodiment additionally has an acceleration sensor 11 that is connected to the bus 14. The acceleration sensor 11 detects the acceleration generated in the electronic acoustic signal generating device when a user shakes or taps the electronic acoustic signal generating device. In addition, a sound source/effect circuit 12 that converts into a musical signal performance information obtained by reproducing performance information input using the performance manipulator, or by reproducing any of the musical data stored in the storage unit 9, and then imparts various effects to that musical signal is also connected to the bus 14. A sound system 13 that converts musical signals from the sound source/effect circuit 12 into sound is connected to this sound source/effect circuit 12. The sound system 13 is formed, for example, by a DAC (digital-to-analog converter), an amplifier, and speakers and the like.

Figure 2A:
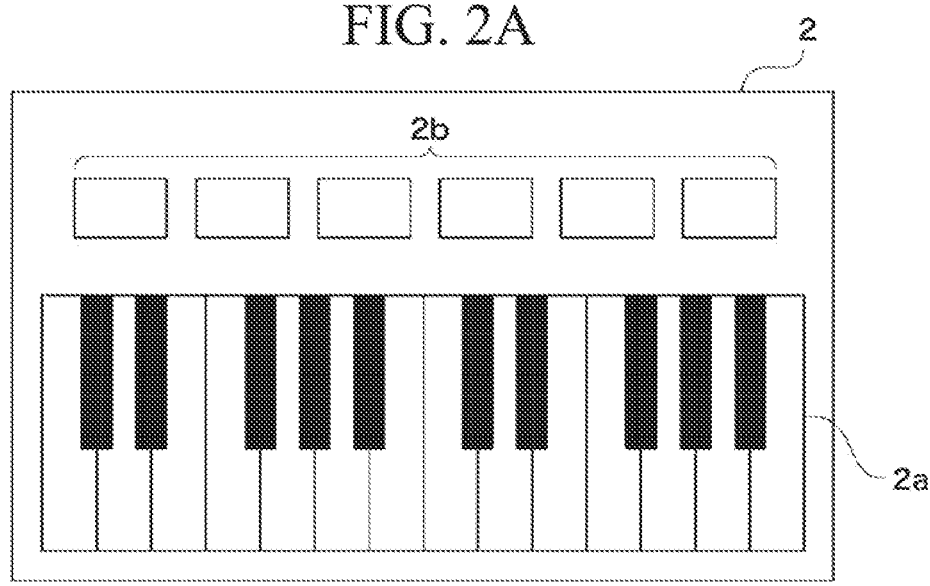
FIG. 2A is a view showing an example of a screen displayed on a touch panel shown in FIG.

As the touch panel 2, in the present embodiment, a panel that is provided with a multipoint recognition function that recognizes simultaneous pressing actions performed by a user in a plurality of positions is employed, however, it is also possible to employ a touch panel that cannot perform multipoint recognition. Because the electronic acoustic signal generating device of the present embodiment is assumed to be a small-size mobile terminal (specifically, a widely used slate PC, or smart phone or the like) that is placed on the palm of the hand and can be operated with just one hand, a small-sized touch panel is also used for the touch panel 2. As is shown in FIG. 2A, an image designed to look like the keyboard of a piano (hereinafter, referred to simply as a keyboard) 2a, and a plurality of buttons (six are shown in the drawing) 2b that are used to make various settings such as tone settings and the like are displayed on the touch panel 2. Note that in the present embodiment, the keyboard 2a is used as a performance manipulator, however, the performance manipulator is not limited to this and various performance manipulators may be used such as the various drums of a drum set or the frets of a guitar or the like. Moreover, the present invention is not limited to performance manipulators, and provided that the device is one that generates acoustic signal in accordance with the manipulation of a manipulator such as the manipulators of a DJ instrument or the manipulators of a game device, and controls signal characteristics such as the volume of the acoustic signal in accordance with the force of the touching action, then any type of device may be employed.

The storage unit 9 includes a storage medium such as, for example, a flexible disk (FD), a hard disk (HD), a CD-ROM, a DVD (digital versatile disc), a magneto-optical disk (MO), or semiconductor memory, as well as the drive device for the same. The storage medium may be one that can be removably attached to the drive device, and the storage unit 9 itself may be one that can be removably attached to the electronic, acoustic signal generating device of the present embodiment. Alternatively, both the storage medium and the storage unit 9 may be non-removable devices. Note that, as is described above, a control program executed by the CPU 6 can be stored in (the storage medium of) the storage unit 9. If no control program is stored in the ROM 7, then by storing the control program in the storage unit 9, and then reading that control program in the RAM 8, the CPU 6 can be made to execute the same type of operations as when the control program is stored on the ROM 7. If this type of structure is employed, then making additions to the control program or installing the latest versions and the like can be achieved easily.

Examples of the communication I/F 10 include dedicated music cable I/F that exclusively transmit and receive musical signals such as MIDI signals and the like, general-purpose short distance cable I/F such as USB (universal serial bus and IEEE 1394 and the like, general-purpose network I/F such as Ethernet (registered trademark) and the like, general-purpose short distance wireless I/F such as wireless LAN (local area network) and Bluetooth (registered trademark) and the like, and communication I/F for digital telephone circuit networks. In the present embodiment, a communication I/F for a digital telephone circuit network and/or for a wireless LAN is employed as the communication I/F 10.

Figure 2B:
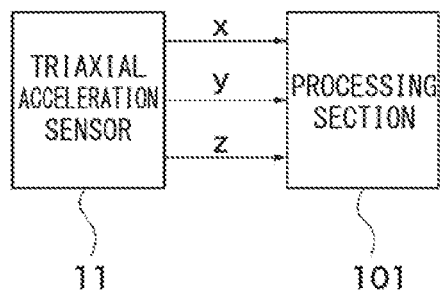
FIG. 2B is a view showing an example of sensor values output by an acceleration sensor shown in FIG. 1.

As is shown in FIG. 2B, the acceleration sensor 11 is a triaxial acceleration sensor that detects acceleration in three axial directions, namely, the x-axis, the y-axis and the z-axis, and outputs sensor values for the three axial directions. The sensor output values for each axis are read from the acceleration sensor 11 at a predetermined, read cycle, and are stored in a sensor output storage area that is secured at a predetermined position in the RAM 8. A processing section (principally formed by the CPU 6, the ROM 7, and the RAM 8) 101 reads the sensor output values for each axis from the sensor output storage area at a predetermined cycle in the present embodiment, this is every 10 msec), and uses them for control processing, (described, below). Note that in a general-purpose instrument such as the electronic acoustic signal generating device of the present embodiment, because the control processing relating to the present invention is not executed independently, but is executed in parallel with a great deal of other processing, there is a possibility that the aforementioned predetermined cycle will vary somewhat.

In the present embodiment, the sound source/effect circuit 12 is assumed to be one that creates music signals by means of hardware alone, and imparts various types of effects to these music signals. However, the sound source/effect circuit is not limited to this, and may be one that creates music signals solely by means of software processing and then imparts various types of effects to these music signals, or one that shares the processing between hardware and software. Moreover, the sound source/effect circuit 12 is not restricted to being provided within the electronic acoustic signal generating device and, for example, it is also possible for the sound source/effect circuit 12 to be provided in an external device that is connected via the communication I/F 10, or for a sound generating command that includes sound generation characteristics control information (i.e., the 'velocity' described below) to be supplied, from the electronic acoustic signal generating device to this external device, so that an acoustic signal can then be generated by this external device.

Moreover, in the present embodiment, a general-purpose slate PC or smart phone that is provided with the touch panel 2, as is described above, is assumed as the form of the electronic acoustic signal generating device, however, the electronic acoustic signal generating device may also be in the form of a dedicated hardware structure for music that, instead of being in the form of a touch panel, is provided with a normal LCD (liquid crystal display) or LED (light emitting diode) and actual manipulators.

An outline of the control processing executed by the electronic acoustic signal generating device having the above described structure will now be described with reference made, firstly, to FIG. 3. This control processing will then be described in detail with reference made to FIG. 4 through FIG. 6D.

When a user touches (i.e., taps) a key of the keyboard 2a with their finger, for example, the electronic acoustic signal generating device of the present embodiment generates a sound at the pitch allocated to the touched key at a volume that corresponds to the force of the touch. The force of this touch is detected based on sensor output values from the acceleration sensor incorporated within the device. The feature of the present embodiment lies in the way in which the sensor output values are used to detect the force of the touch. Note that the number of keys touched is not limited to one key, and even if a plurality of keys are touched, sounds whose pitches correspond to the number of keys touched are generated.

When the sensor output is output from the acceleration sensor 11, the CPU 6 reads the sensor output values for each axis from within the sensor output storage area in the RAM 8, and then performs the calculation of the following Formula (1) so as to calculate the square root of the sum of squares of the differentials in the sensor output values of each axis.

$$\{(x_t-x_{t-1})^2+(y_t-y_{t-1})^2+(z_t-z_{t-1})^2\}^{1/2} \qquad (1)$$

Here, $x_t$, $y_t$, and $z_t$ represent the respective sensor output values for the x-axis, the y-axis and the z-axis at the current time t, $x_{t-1}$, $y_{t-1}$, and $z_{t-1}$ represent the respective sensor output values for the x-axis, the y-axis and the z-axis at the time t−1, which is one cycle prior to the current time t. In this way, because the sensor output values for each axis for both the current time and for one cycle prior to the current time are required, a current sensor output storage area and a prior sensor output storage area are secured at predetermined positions in the RAM 8, and the sensor output values for each axis that are read from the sensor output storage areas are firstly stored in the current sensor output storage area, and then once the above-described calculation has ended, they are read from the current sensor output storage area and are then saved in the prior sensor output storage area.

In the above-described Formula (1), the reason why the differentials are taken for the sensor output values of each axis is so that the effects of gravitational acceleration can be removed from the sensor output values of each axis. The reason why the square root of the sum of squares of (the differentials of) the sensor output values is taken for each axis is so that the effects of the attitude of the device (i.e., such as whether the device is being, held vertically in the hand, or whether it is being held on a tilt, or whether it is being held horizontally), and the direction of the force when the device was touched, and the like can be removed. Note that the calculation formula is not limited to the above-described Formula (1).

The calculation results (i.e., the acceleration data) that have been calculated in the manner described above are saved as a plurality of logs (five logs in the present embodiment, however, the number is not limited to this) going backwards into the past from the current time Namely, five items of acceleration data are saved in the RAM 8 in sequence starting from the most recent.

Figure 3:
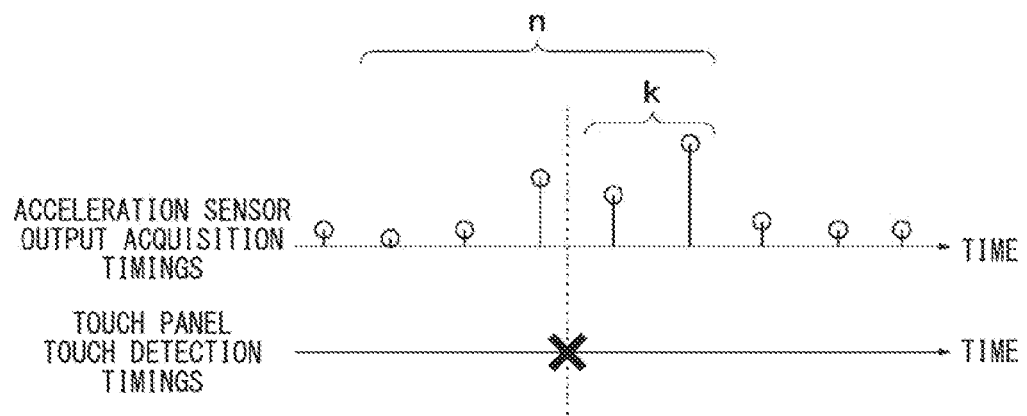
FIG. 3 is a timing chart showing timings for acquiring outputs from the acceleration sensor shown in FIG. 1.

FIG. 3 shows an example of a method used to select the calculation result to be used for the control processing from among, the plurality of calculation results (i.e., items of acceleration data) that have been saved as logs. The symbol n in the drawing shows the number of calculation results saved as a log and, in the present embodiment, n=5.

When a user touches a particular key on the keyboard 2a, the fact that a key has been touched is detected by the detection circuit 4. The symbol "X" in FIG. 3 shows the timing when this touch was detected. When a touch is detected, the CPU 6 subsequently waits for k number (in the present embodiment, k=2) of calculation results (i.e., acceleration data items) to be saved. Next, the CPU 6 selects from among the 5 calculation results that include these 2 calculation results those calculation results that correspond to predetermined conditions.

Here, examples of these predetermined conditions may include the calculation result having the highest value, or the calculation results having the highest value and the next highest value, or the like. As in the case of the latter, if a plurality of calculation results are selected, then the average value of these may be taken. In the present embodiment, the calculation result having the highest value is used for the predetermined condition. Accordingly, in the example shown in the drawing, the calculation result indicated by the arrow having the description 'value used' is selected. The selected calculation result is used to decide the sound volume, as is described above, and the method used to decide this is described below.

In the present embodiment, several sensor outputs from the acceleration sensor 11 (in actuality, not the actual sensor outputs themselves, but the above-described calculation results obtained by performing a predetermined operation on the sensor outputs; sometimes referred to as acceleration data) are saved in sequence from newest data and tracing backwards from the most recent one, and that becomes the subject for selection. In particular, not only the sensor output after the touching action by the user on the touch panel 2 was detected, but also the sensor output prior to that are included in the plurality of saved sensor outputs.

In this manner, the reason why both the sensor output prior to the touching action being detected and the sensor output after the touching action was detected are made subjects for selection is because it was confirmed in experiments performed by the inventors of the present application that not only are there cases m which a sizable acceleration is obtained at the point when the touch panel 2 was touched, but there are also cases when a large acceleration is obtained slightly before or slightly after the point when the touch panel 2 was touched. The reason for this is because, as is described above, due to the fact that a large quantity of processing is performed in parallel, the temporal attitude of a lame sensor output value (i.e., a value that may be considered to reflect the original touching force) changes in accordance with the way in which the device is touched (i.e., whether the user touches the panel surface of the touch panel 2 perpendicularly or touches it somewhat obliquely, and the like) or the way in which the device is being held (i.e., whether the device is being held in a hand or whether it has been placed on a desk, and the like).

Note that how many sensor output values before the touching action was detected should be saved and how many after the touching action was detected should be saved can be decided arbitrarily by considering the cycle at which the output values from the acceleration sensor 11 are detected, and how much of a delay between the point when the touching action is detected and the point when a sound generating command is issued is permissible, and the like, and is not limited to three before the detection and two after the detection, as is the case in the present embodiment.

In this manner, in the electronic acoustic signal generating device of the present embodiment, when a plurality of sensor outputs from the acceleration sensor 11 are to be saved, sensor outputs from both before and after the point in time when a touching action by a user on the touch panel 2 was detected are saved, and the sensor output having the maximum value is selected from among the plurality of saved sensor outputs, and this is used to decide the volume of the sound that is generated. Namely, even if there is a difference between the timing when a touching action by a user is detected from the touch panel 2, and the timing when (an acceleration output that corresponds to) that touching action is detected from the acceleration sensor 11, a sensor output (i.e., acceleration data) that appropriately shows the acceleration of that touch ma action by the user is included among the plurality of saved sensor outputs. This sensor output is then selected depending on whether or not it satisfies predetermined conditions (here, whether or not it is the maximum value). Because the musical characteristics (here, the volume) are decided based on the selected sensor output (i.e., acceleration data), it is possible to decide musical characteristics that more closely match the musical characteristics that correspond to the touching action of the user.

Note that in the present embodiment, the selected sensor output is used to decide the volume of the sound that is generated, however, the present invention is not limited to this and the selected sensor output may also be used to decide other musical characteristics such as, for example, the tone or the like.

Next, the control processing will be described in detail.

FIG. 4 is as flowchart showing a procedure for touch/move/release detection processing executed by the electronic acoustic signal generating device of the present embodiment and, in particular, by the CPU 6 thereof. This touch/move/release detection processing is started up and executed at, for example, 5 msec intervals.

In this touch/move/release detection processing, principally:
(O1) a series of user actions, namely, a first action in which the user touches a key of the keyboard 2a, and a second action in which the user releases the touching finger and
(O2) a series of user actions, namely, a first action in which the user touches a key of the keyboard 2a, a second action in which the user moves the touching finger over the key while maintaining the touching state, and a third action in which the user releases the touching finger are detected. However, the respective series of user actions described in (O1) and (O2) are designed to be performed using, only one finger, and if a plurality of fingers are used to perform these actions, then the series of user actions of (O1) or (O2) may be detected in parallel the same number of times as the number of fingers that are used.

In the detection circuit 4, when any one of a touching action, a moving action or as releasing action is detected, then the type of action that is detected (i.e., whether it is a touch, a movement, or a release), as well as the coordinates on the touch panel 2 at that time are notified to the CPU 6. Note that when a moving action is detected, two sets of coordinates, namely, those before the movement and those after the movement are notified to the CPU 6.

Firstly, of the series of user actions described in (O1), when the first action (the touching action) is performed, the fact that a touching action is being performed, as well as the coordinates at that time are notified from the detection circuit 4. Immediately after this notification, the CPU 6 initiates the touch/move/release detection processing. The CPU 6 creates a new record in the touch control register, and records the touched coordinates (i.e., the coordinates of the touched position on the touch panel 2) as the initial coordinates and the current coordinates.

Next, the CPU 6 determines the manipulator ID (identification) corresponding to those coordinates, and notifies the sound generation control processing shown in FIGS. 5A and 5B (described below) as to the fact that the manipulator having that manipulator ID has been turned on (step S1→S2→S3→S4). The touch control register is a register that is guaranteed in a predetermined position in the RAM 8 and, as is shown in FIG. 6A, is provided, with areas where a plurality of groups of data can be stored, with each data group composed of initial coordinates (x, y) and current coordinates (x, y). The data structure of each group is called a 'record'.

The manipulator IDs are IDs that are allocated respectively to the images of each key of the keyboard 2a The ID of each image of each key (i.e., manipulator) as well as the coordinates of where that image is located are registered in an image coordinate table (not shown), and the manipulator ID displayed at those coordinates can be acquired from the touched coordinates.

Next, of the series of user actions described in (O1), when the second action (i.e., the release action) is performed, the fact that a release action has been performed, as well as the coordinates at that time are notified from the detection circuit 4. In the touch/move/release detection processing that is initiated immediately after this notification, the CPU 6 searches for the record where the released coordinates (i.e., the coordinates of the released position on the touch panel 2) match the current coordinates in the touch control register. The CPU 6 then determines the manipulator ID that corresponds to the initial coordinates recorded in that record. The CPU 6 also notifies the above-described sound generation control processing about the fact that the manipulator having that manipulator ID has been turned off, and deletes that record from the touch control register (step S1→S5→S7→S8→S9). Note that in the series of user actions in (O1), the record where the released coordinates match the current coordinates is definitely stored in the touch control register.

In contrast, of the series of user actions described in (O2), when the first action (i.e., the touching action) is performed, the fact that a touching action is being performed, as well as the coordinates at that time are notified from the detection circuit 4. Immediately after this notification, the touch/move/release detection processing is initiated and the CPU 6 executes the same type of processing as the processing executed when the first action (i.e., the touching action) from among the series of user actions of the above-described (O1) was performed (step S1→S2→S3→S4).

Next, of the series of user actions described in (O2), when the second action (i.e., the moving action) is performed, in addition to the fact that a moving action is being performed as well as the coordinates at that time, the coordinates prior to the movement are also notified from the detection circuit 4. As a result of this notification, the touch/move/release processing is initiated immediately thereafter, and the CPU 6 searches for the record where the coordinates prior to the movement match the current coordinates in the touch control register. If matching coordinates exist, the CPU 6 records the coordinates after the movement as the current coordinates (i.e., updates the current coordinates to the coordinates after the movement) (step S1→S5→S6).

In this second action (i.e., moving action), when the user moves their touching finger, if the position after the movement is still on the same manipulator, then, naturally, only the current coordinates are updated. In this case, in the present embodiment, even if the touching, finger moves onto another manipulator from above the manipulator prior to the movement, or moves onto an area outside the manipulators, only the current coordinates are updated. Next, when the third action (i.e., the releasing action) (described below) is performed, the CPU 6 refers to the touch control register and determines the initial coordinates, and then acquires the manipulator ID corresponding to the initial coordinates and performs a muting operation. Namely, even if the finger moves off the manipulator as a result of performing a moving action, the same state as when the manipulator was being manipulated is maintained.

Instead of this, if the user's finger is shifted by a moving action from above a manipulator to a position above a new manipulator, then a releasing action may firstly be considered to have been performed at the coordinates prior to this movement, and processing that corresponds to the third action (i.e., the releasing action—described below) is executed, and a new touching action may be considered to have been performed at the coordinates after the movement, so that processing that corresponds to the above-described first action (i.e., the touching action) is executed. By employing this method, if a user's finger is shifted by a moving action from above a manipulator, then the sound is temporarily muted, and a musical sound that corresponds to the new manipulator is generated. Note that if the finger moves onto a manipulator from somewhere outside the manipulators, then this is regarded solely as a new touching action, while if the finger moves from a manipulator to somewhere outside the manipulators, then this is regarded solely as a releasing action. Moreover, it is also possible to employ a system in which a user is able to select whether to perform an action of the present embodiment, or whether to perform another action instead.

Next, of the series of user actions described in (O2), when the third action (i.e., the releasing action) is performed, the fact that a releasing action has been performed, as well as the coordinates at that time are notified from the detection circuit 4. As a result of this notification, immediately afterwards, the touch/move/release detection processing is initiated and the CPU 6 executes the same type of processing as the processing executed when the second action (i.e., the releasing action) from among the series of user actions of the above-described (O1) was performed (step S1→S5→S7→S8→S9).

Figure 5A:
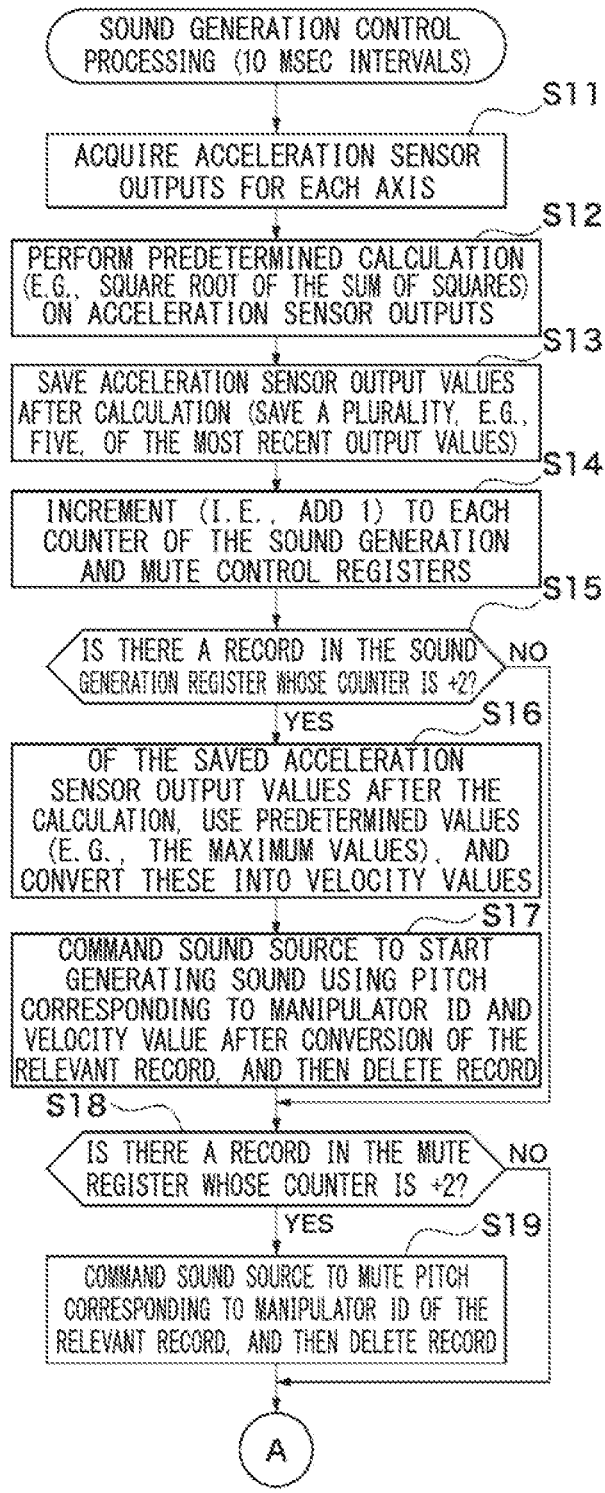
FIG. 5A is a flowchart showing the first half of a procedure for sound generation control processing performed by the electronic acoustic signal generating device according to an embodiment of the present invention.
Figures 6A, 6B, 6C, 6D:
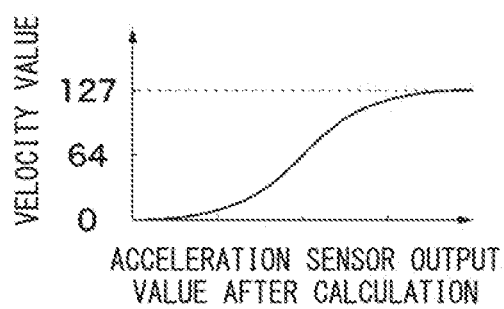
FIG. 6A is a table showing a touch control register used by the electronic acoustic signal generating device according to an embodiment of the present invention.
FIG. 6B is a table showing a sound generation control register used by the electronic acoustic signal generating device according to an embodiment of the present invention.
FIG. 6C is a table showing a mute control register used by the electronic acoustic signal generating device according to an embodiment of the present invention.
FIG. 6D is a graph showing a velocity value conversion function used by the electronic acoustic signal generating device according to an embodiment of the present invention.

FIGS. 5A and 5B are flowcharts showing a procedure tier sound generation control processing executed by the electronic acoustic signal generating device, in particular, the CPU 6 of the present embodiment. This sound generation control processing is started up and executed at, for example, 10 msec intervals.

This sound generation control processing principally includes:

(1) Sensor output related processing which relates to the sensor output from the acceleration sensor 11 (steps S11 to S13);

(2) Sound generation processing (steps S16 and S17);

(3) Mute processing (step S19);

(4) Sound generation control register initialization on processing (step S21); and (5) Mute control register initialization processing (step S23).

When this sound generation control processing is initiated, in the sensor output related processing mentioned above in (1), firstly, as was described above in the outline of the control processing, the CPU 6 reads the sensor output values of each axis from the sensor output storage area and stores them in the current sensor output storage area (step S11). Next, the CPU 6 performs the calculation of the above-described Formula (1) on the sensor output values of each axis that are stored respectively in the current sensor output storage area and the prior sensor output storage area (step S12). Thereafter, the calculation results are saved in a ring buffer (not shown) that is secured at a predetermined position in the RAM 8 (step S13).

As is described above, because a plurality (for example, five) of the most recent calculation results that were obtained in the form of a time series are saved, in the present embodiment, if the number of calculation results obtained is in excess of the number to be saved, then a ring buffer is employed that makes it possible to easily save those calculation results. Moreover, the present invention is not limited to this and it is also possible to employ normal memory and to control the number to be saved, using software.

Note that, although not described in the flowchart, in the sensor output related processing of (1), the CPU 6 reads the sensor output values for each axis that are stored in the current sensor output storage area after firstly performing the processing of step S13, and then executes the processing to store these sensor output values in the prior sensor output storage area.

Moreover, when this sound generation control processing is initiated, in some cases the sensor output values for the respective axes may not yet have been stored in the prior sensor output storage area. In such cases, because the CPU 6 is not able to execute the calculation processing of step S12, it does not execute the processing of step S12 and step S13 continuing on from the processing to stow in the current sensor output storage area the sensor output values for each axis that it has read from the sensor output storage area, but instead executes processing to store in the prior sensor output storage area the area.

Next, the CPU 6 increments the values of each counter in the sound generation control register and the mute control register by 1 (step S14). Both the sound generation control register and the mute control register are secured at predetermined positions in the RAM 8 and, as is shown in FIGS. 6B and 6C, are provided with areas where a plurality of groups of data (i.e., records) that are made up of a manipulator ID and (software) counters can be stored. In some cases, there is not even a single record stored in the sound generation control register or the mute control register, and in this case, the CPU 6 does not, of course, perform the incrementing of step S14.

Next, if a record whose counter value has reached '+2' is present within the sound generation control register, the CPU 6 moves the processing forward to the sound generation processing of (2) (step S15→S16). A counter value of +2 in the sound generation control register means that this sound generation control processing has been initiated, twice after the notification 'manipulator on' has been received from the touch/move/release detection processing Namely, in FIG. 3, this means that the sensor output values for each axis have been acquired k number of (=2) times after the touching action of the user on the touch panel 2 has been detected, and shows that this timing is the timing for commanding that a sound be generated.

In the sound generation processing of (2), firstly, the CPU 6 employs calculation results that correspond to predetermined, conditions (for example, those having the maximum value) from among the calculation results saved in the ring buffer, and converts these into velocity values (step S16).

FIG. 6D shows an example of as function which forms the conversion characteristics used when the employed calculation results are convened into values. The function in FIG. 6D is a sigmoid function, which is an example of a non-linear function. Naturally, it is also possible to use another non-linear function, and neither is the present invention limited to non-linear functions and it is also possible to use a linear function. Furthermore, it is also possible to define a 'velocity—sensibility' parameter, and to enable the shape of the function to be changed using this parameter.

Next, the CPU 6 commands the sound source/effect circuit 12, which is the sound source section, to start sound generation using the pitch that corresponds to the manipulator ID for that record and also the velocity values after the aforementioned conversion, and then deletes that record from the sound generation control register (step S17). In the sound source/ effect circuit 12, a musical signal is created using the musical characteristics of the acoustic signal such as the volume and tone and the like that were decided in accordance with the commanded velocity values.

Next, provided that there is a record in the mute control register whose counter value is '+2', the CPU 6 moves the processing forward to the mute processing of (3) (step S18→S19), and commands the sound source/effect circuit 12 to mute the pitch that corresponds to the manipulator ID of that record. That record is then deleted from the mute control register.

Here, a counter value of +2 in the mute control register means that this sound generation control processing has been initiated twice after the notification 'manipulator off' has been received from the touch/move/release detection processing. Namely, this means that the sensor output values for each axis have been acquired twice after the releasing of the touching action of the user on the touch panel 2 has been detected.

However, in the muting processing of (3), unlike the sound generation processing of (2), the calculation results stored in the ring buffer are not used. Accordingly, because it is not necessary to monitor the counter values within the mute control register in order to wait for new calculation results to be input into the ring buffer, the counter value of +2 in the mute control register is only used in order to match the time between the detection of the release of the touching action by the user on the touch panel 2 and the starting of the muting with the time between the detection of the touching of the touch panel 2 by the user and the starting of the sound generation.

Next, when the CPU 6 receives the 'manipulator on' notification from the touch/move/release detection processing, it moves the processing forward to the sound generation control register initialization processing of (4) (step S20→S21). It also creates a new record in the sound generation control register, records the manipulator ID, and sets the counter to '0'.

Moreover, when the CPU 6 receives the 'manipulator off' notification from the touch/move/release detection processing, it moves the processing forward to the mute control register initialization processing of (5) (step S22→S23). It also creates a new record in the mute control register, records the manipulator and sets the counter to '0'.

Note that, as alternative operations to those of the present embodiment, it is also possible to employ a predetermined default value as the velocity value when the user's finger is moved by a moving action from above a manipulator before the movement to above a manipulator after the movement. Moreover, it is also possible to save the velocity value that is used to generate the sound of the manipulator before the movement, and to use this velocity value as the velocity value that is used to generate the sound of the manipulator after the movement.

Because there is no velocity value that is used to generate the sound of the manipulator prior to the movement when the user's finger moves from outside the manipulators to a position above a manipulator, a predetermined default value may be used for the velocity value in this case.

Moreover, in the present embodiment, a plurality of calculation results that were obtained by performing a predetermined operation on the detected acceleration values were saved as a log. However, the present invention is not limited to this and it is also possible to save a plurality of the detected acceleration values (i.e., acceleration data) as a log, and, in the sound generation processing (step S16 in FIG. 5A), after firstly performing a predetermined calculation on the respective values of a saved plurality of acceleration groups, to then employ predetermined results from the ensuing calculation results.

Note that it is also possible to achieve the objects of the present invention by supplying a storage medium on which a software program code that achieves the functions of the above-described embodiment has been recorded to a system or device, and by a computer (or CPU or MPU) of that system or device reading and executing the program code stored on the storage medium.

In this case, the actual program code itself that is read from the storage medium achieves the new functions of the present invention, and the present invention is formed by this program code and the storage medium on which the program code is stored.

Examples of a storage medium that may be used to supply program code include flexible disks, hard disks, magneto-optical disks, CD-ROM, CD-R, CD-RW, DVD-ROM, DVD-RAM, DVD-RW, DVD+RW, magnetic tape, a non-volatile memory card, ROM and the like. Moreover, the program code may also be supplied from a server computer via a communication network.

Moreover, not only is it possible for the functions of the above-described embodiment to be achieved as a result of program code read by a computer being executed, but it is also possible for an OS or the like that is operating on that computer to perform a portion of or all of the actual processing based on the commands of that program code, and for the functions of the above-described embodiment to be achieved by this processing.

Furthermore, it is also possible for the program code read from the storage medium to firstly be written into memory that is provided in a function expansion board that is inserted into the computer, or is provided, in a function expansion unit that is connected to the computer, and for the CPU or the like that is provided on the function expansion board or that function expansion unit to perform a portion of or all of the actual processing based on the commands of that program code, and for the functions of the above-described embodiment to be achieved by this processing.

REFERENCE SYMBOLS

2 ... Touch panel
5 ... Display circuit
6 ... CPU
8 ... RAM
11 ... Acceleration sensor

The invention claimed is:

1. An electronic acoustic signal generating device comprising:
   a touch panel;
   a display circuit that displays a manipulator on the touch panel;
   an acceleration sensor that detects an acceleration when a touching action is performed on the manipulator on the touch panel;
   a storage section that acquires at predetermined regular intervals acceleration data that shows the acceleration detected by the acceleration sensor, and saves n number of items of the acceleration data in sequence of newest first;
   a processing circuit that, after a touching action by a user on the manipulator displayed on the touch panel has been detected, saves k (wherein k<n) number of items of the acceleration data in the storage section, and then selects at least one item of the acceleration data that matches predetermined conditions from among the n number of items of the acceleration data that include the k number of items of the acceleration data; and
   a sound effect/source circuit that, based on the one item of the acceleration data selected by the processing circuit, decides signal characteristics of an acoustic signal that should be generated.

2. The electronic acoustic signal generating device according to claim 1, wherein each of the n values and k values can be altered to desired values provided that the condition k<n remains in effect.

3. The electronic acoustic signal generating device according to claim 1, wherein the sound source/effect circuit converts the acceleration data selected by the processing circuit into velocity values based on predetermined conversion characteristics, and decides the signal characteristics of the acoustic signal using the converted velocity values.

4. An electronic acoustic signal generating method comprising the steps of:
   displaying a manipulator on a touch panel;
   detecting an acceleration by an acceleration sensor when a touching action is performed on the manipulator on the touch panel;
   acquiring acceleration data that shows the acceleration detected by the acceleration sensor at predetermined regular intervals so as to save in a storage section n number of items of the acceleration data in sequence of newest first;
   detecting a touching action of a user on the manipulator displayed on the touch panel;
   saving k (wherein k<n) number of items of the acceleration data in the storage section after the touching action has been detected;
   selecting at least one item of the acceleration data that matches predetermined conditions by a processing circuit from among the n number of the items of the acceleration data that include the k number of items of the acceleration data saved in the storage section; and
   determining signal characteristics of an acoustic signal that should be generated based on the acceleration data selected by the processing circuit.

5. The electronic acoustic signal generating method according to claim 4, wherein each of the n values and k values can be altered to desired values provided that the condition k<n remains in effect.

6. The electronic acoustic signal generating method according to claim 4, wherein the step of deciding the signal characteristics of the acoustic signal comprises: a step in which the selected acceleration data is converted into velocity values based on predetermined conversion characteristics; and a step in which the signal characteristics of the acoustic signal are decided using the converted velocity values.

7. A non-transitory computer readable medium containing an electronic acoustic signal generating program that causes to be executed on a computer provided with a touch panel and an acceleration sensor the steps of:

displaying a manipulator on the touch panel;
    detecting an acceleration by the acceleration sensor when a touching action is performed on the manipulator on the touch panel;
    acquiring acceleration data that shows the acceleration detected by the acceleration sensor at predetermined regular intervals so as to save in a storage section n number of items of the acceleration data in sequence of newest first;
    detecting a touching action of a user on the manipulator displayed on the touch panel;
    saving k (wherein k<n) number of items of the acceleration data in the storage section after the touching action has been detected;
    selecting at least one item of the acceleration data that matches predetermined conditions by a processing circuit from among the n number of the items of the acceleration data that include the k number of items of the acceleration data saved in the storage section; and
    determining signal characteristics of an acoustic signal that should be generated based on the acceleration data selected by the processing circuit.

8. The electronic acoustic signal generating program according to claim 7, wherein each of the n values and k values can be altered to desired values provided that the condition k<n remains in effect.

9. The electronic acoustic signal generating method according to claim 7, wherein the step of deciding the signal characteristics of the acoustic signal comprises: a step in which the selected acceleration data is converted into velocity values based on predetermined conversion characteristics; and a step in which the signal characteristics of the acoustic signal are decided using the converted velocity values.

10. The electronic acoustic signal generating device according to claim 2, wherein the sound source/effect circuit converts the acceleration data selected by the processing circuit into velocity values based on predetermined conversion characteristics, and decides the signal characteristics of the acoustic signal using the converted velocity values.

11. The electronic acoustic signal generating method according to claim 5, wherein the step of deciding the signal characteristics of the acoustic signal comprises: a step in which the selected acceleration data is converted into velocity values based on predetermined conversion characteristics; and a step in which the signal characteristics of the acoustic signal are decided using the converted velocity values.

12. The electronic acoustic signal generating method according to claim 8, wherein the step of deciding the signal characteristics of the acoustic signal comprises: a step in which the selected acceleration data is converted into velocity values based on predetermined conversion characteristics; and a step in which the signal characteristics of the acoustic signal are decided using the converted velocity values.

* * * * *